US009424883B2

(12) United States Patent
Shi (10) Patent No.: US 9,424,883 B2
(45) Date of Patent: *Aug. 23, 2016

(54) METHOD AND APPARATUS FOR EDITING A VIDEO AND/OR AUDIO PROGRAM

(71) Applicant: KONINKLIJKE PHILIPS N.V., Eindhoven (NL)

(72) Inventor: Jun Shi, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,293

(22) Filed: Oct. 26, 2015

(65) Prior Publication Data

US 2016/0042764 A1   Feb. 11, 2016

Related U.S. Application Data

(63) Continuation of application No. 14/264,614, filed on Apr. 29, 2014, now Pat. No. 9,171,579, which is a continuation of application No. 12/092,827, filed as application No. PCT/IB2006/054075 on Nov. 3, 2006, now Pat. No. 8,712,224.

(30) Foreign Application Priority Data

Nov. 7, 2005 (CN) .......................... 2005 1 0120156

(51) Int. Cl.
*G11B 27/034* (2006.01)
*G11B 27/036* (2006.01)
(Continued)

(52) U.S. Cl.
CPC ........... *G11B 27/034* (2013.01); *G11B 27/036* (2013.01); *G11B 27/105* (2013.01); *G11B 27/3027* (2013.01); *G11B 2220/216* (2013.01); *G11B 2220/2545* (2013.01)

(58) Field of Classification Search
CPC ........................... G11B 27/034; G11B 27/036
See application file for complete search history.

(56) References Cited

U.S. PATENT DOCUMENTS 5,057,932 A    10/1991   Lang
5,696,869 A *  12/1997   Abecassis ................ G11B 7/14
                                              348/E5.102
(Continued)

FOREIGN PATENT DOCUMENTS

EP      0940982 A2    9/1999
EP      1538625 A2    6/2005
(Continued)

OTHER PUBLICATIONS

International Search Report of International Application No. PCT/IB2006/054075 Contained in International Publication No. WO2007052232.
(Continued)

*Primary Examiner* — Andy Rao
*Assistant Examiner* — Ali Shayanfar (57) ABSTRACT

The present invention provides a method and apparatus for editing an audio/video program. The method comprises the steps of acquiring the description information of two program segments of the program, the program segments being in sequence in playing order, the description information comprising the ending description information of the previous program segment and the start point information of the subsequent program segment, generating a guiding information to guide the ending point information to the start point information according to the description information and playing order of the program segments and updating the description information of the program according to the guiding information. With this invention, excessively detailed application editing work and an expense of high buffering cost may be avoided in editing compact disc program.

78 Claims, 4 Drawing Sheets

(51) Int. Cl.
*G11B 27/10* (2006.01)
*G11B 27/30* (2006.01)

(56) References Cited

U.S. PATENT DOCUMENTS

| | | | |
|---|---|---|---|
| 5,930,446 | A | 7/1999 | Kanda |
| 5,995,471 | A | 11/1999 | Saoyama et al. |
| 6,088,304 | A | 7/2000 | Aramaki et al. |
| 6,148,140 | A | 11/2000 | Okada et al. |
| 6,181,870 | B1 | 1/2001 | Okada et al. |
| 6,415,095 | B1 | 7/2002 | Morishima et al. |
| 6,571,255 | B1 * | 5/2003 | Gonsalves ............ G11B 27/034 |
| 6,640,044 | B2 | 10/2003 | Greenwood et al. |
| 7,054,547 | B1 * | 5/2006 | Abecassis ................. G11B 7/14 386/282 |
| 2002/0135607 | A1 | 9/2002 | Kato et al. |
| 2003/0052910 | A1 | 3/2003 | Shiiyama |
| 2003/0071824 | A1 * | 4/2003 | Gonsalves ............ G11B 27/034 345/589 |
| 2003/0149980 | A1 * | 8/2003 | Hassell ............... H04N 21/6143 725/39 |
| 2003/0172383 | A1 * | 9/2003 | Takagi ................. G11B 27/034 725/89 |
| 2003/0177503 | A1 * | 9/2003 | Sull .................... G06F 17/30796 725/112 |
| 2003/0197710 | A1 * | 10/2003 | Gonsalves ............. G11B 27/34 345/600 |
| 2005/0050062 | A1 | 3/2005 | Hanes et al. |
| 2005/0206751 | A1 * | 9/2005 | Manico ................ G11B 27/034 348/239 |

FOREIGN PATENT DOCUMENTS

| | | |
|---|---|---|
| JP | 10106237 A | 4/1998 |
| WO | 2004053875 A2 | 6/2004 |

OTHER PUBLICATIONS

Written Opinion of the International Searching Authority for International Application No. PCT/IB2006/054075.

* cited by examiner

METHOD AND APPARATUS FOR EDITING A VIDEO AND/OR AUDIO PROGRAM

CROSS REFERENCE TO RELATED APPLICATIONS

This application claims benefit or priority of the following applications, and is a continuation of application Ser. No. 14/264,614, filed Apr. 29, 2014, (now U.S. Pat. No. 9,171,579 granted Oct. 27, 2015), which is a continuation of application Ser. No. 12/092,827, filed May 7, 2008, (now U.S. Pat. No. 8,712,224 granted Apr. 29, 2014), which is a national stage of PCT/IB2006/054075, filed Nov. 3, 2006, which claimed priority of Chinese application 200510120156.4, filed Nov. 7, 2005, the contents of all of which are incorporated herein in whole by reference.

FIELD OF THE INVENTION

The present invention relates to the technical field of multimedia storage, in particular to a method and apparatus for editing and storing an audio/video program.

BACKGROUND OF THE INVENTION

In the field of digital programs, the editing of program contents is always accompanied by editing the integral structure of the program. The editing of the program structure always leads into a plurality of program segments divided due to content editing (for example, deletion or addition, etc.) as independent programs, or buffering the plurality of program segments and re-allocating resources and thereby integrally store them as one file. These technical solutions are relatively adaptable to edit simple audio/video stream programs, but are hardly adaptable to-complex audio/video stream programs in the optical storage field.

In the optical storage field, with the increasing enhancement of playing functions of optical disc players, in particular interactive functions, a program data stream and the corresponding application are getting more complex. The application and program data stream closely correspond to each other, wherein the complex calling relation and interacting relation of the program contents are always included, therefore, the editing of program contents and structure will be accompanied by the editing of complex applications. If processing each program segment as an independent program, the editing of the relevant application will become very complex, for the reason that the objects processed by the application has been changed from a single program to multiple programs.

Sometimes, it is quite possible that the modification of the application cannot be carried out. In order to adapt to different consumers' requirements, the optical disc format provides the optical disc writing and playing functions in different function layers. A higher function layer supplies the user with powerful navigation functions such as various menus and interactions, whereas a lower function layer provides conventional navigation functions like a relatively simple menu.

For example, a low function optical disc writing means may delete a segment of program content recorded on a high function re-writable optical disc, and at the same time, correspondingly edit the application on a low function layer, however, it cannot modify the application on the high function layer because it is unable to identify the information on the higher function layer. If using a high function optical disc playing means to play back the optical disc again, the application will continue to call that segment of program content having been deleted, because the application on the high function layer is not edited correspondingly, then inevitably an error of playing is generated.

In addition, optical disc programs usually have a relatively large amount of data, if various program segments are buffered and integrated into a complete file and stored on the optical disc, it will need a very big buffering space and has a very critical requirement for the buffering means, so the cost is quite high.

Therefore, a method and apparatus for editing optical disc programs to edit the programs on a re-writable optical disc, needs to be provided, thereby avoiding not only the employment of the buffering means of high cost and complex editing of the relevant application, but also the conflict in playing between the program and application due to different function layers.

OBJECT AND SUMMARY OF THE INVENTION

The object of the invention is to provide a method and apparatus for editing multimedia programs so as to overcoming the disadvantages in the prior art.

According to an embodiment of this invention, a method for editing a program on a re-writable optical disc, the method comprising the steps of: acquiring the description information of two program segments of the program, the program segments being in sequence in playing order, the description information comprising the ending point information of the previous program segment and the start point information of the subsequent program segment, generating a guiding information to guide playing to the ending point information of the previous segment and/or from the start point information of the subsequent segment according to the description information and playing order of the program segments and updating the description information of the program according to the guiding information.

Each program segment may be a program part that is formed during editing of the content of the program, and it is independent of other parts of the program. For example, a newly added program part or a remaining program segments after deletion, etc. The start point information and ending point information may be the time information, or the address information respectively of both ends.

According to an embodiment of the invention, an apparatus for editing a program on a re-writable optical disc is provided, the apparatus comprising of acquiring means for acquiring the description information of two program segments of the program, the program segments being in sequence in playing order, the description information comprising the ending point information of the previous program segment and the start point information of the subsequent program segment, generating means for generating a guiding information to guide playing from the ending point information to the start point information according to the description information and playing order of the program segments and updating means for updating the description information of the program according to the guiding information.

With the method and apparatus for editing optical disc programs provided in the present invention, when the content of a program is edited, it is not necessary to edit the relevant application. No matter whether the applications and the program editing operation are in the same function layer, it is not necessary to perform integration and buffering of the edited program, therefore excessively detailed application editing work and an expense of high buffering cost may be avoided.

Through the following description of the invention made with reference to the drawings as appended and the claims, the object and achievements of the invention will become obvious, and a comprehensive understanding of the invention will be obtained.

BRIEF DESCRIPTION OF THE DRAWINGS

The invention will be explained in detail with reference to the appended drawings through specific embodiments.

FIG. 4-1 is a schematic diagram illustrating the first case of calling a program edited according to the invention;

FIG. 4-2 is a schematic diagram illustrating the second case of calling a program edited according to the invention;

FIG. 4-3 is a schematic diagram illustrating the third case of calling a program edited according to the invention;

FIG. 4-4 is a schematic diagram illustrating the fourth case of calling a program edited according to the invention. In the above drawings, the same reference signs represent the same, similar, or corresponding features or functions.

DETAILED DESCRIPTION OF THE INVENTION

Figure 1:
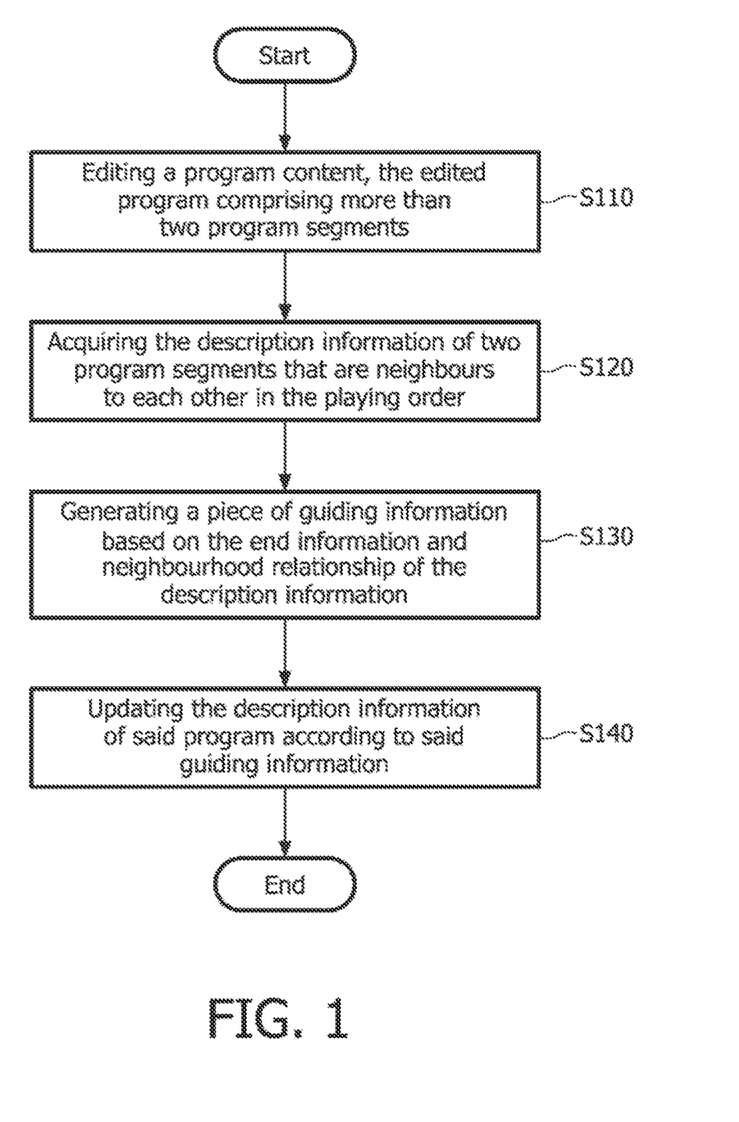
FIG. 1 is a flow chart of the method for editing optical disc programs according to an embodiment of the invention.

FIG. 1 is a flow chart of the method for editing optical disc programs according to an embodiment of the invention. Initially, editing the content of a program on the optical disc, and the edited program comprises more than two program segments after the edition (step S110).

The editing of the program comprises such operations as deleting, adding and modifying parts of the program. The editing divides the program into two or more program segments.

For example, the content of a piece of program segment is added to a certain middle position of the program, and the edited program includes three program segments. They are the newly added program segment, the program part before this new segment and the program content after this new segment. In another example, since a segment of program is deleted from a certain middle position of the program, the edited program comprises two program segments, that is, the program segment before the deleted content, and the program segment after the deleted content. More than two program segments will be created if deleting or adding a plurality of program segments.

In particular, the content editing of the program may further include the deletion or substitute of the whole program. If the whole program is deleted, it may be deemed that the original program is divided into two segments. In the first segment, the address of the start point is identical to the address of the ending point, and is also the same as the address of the start point of the original program. In the second segment, the address of the start point is identical to the address of the ending point, and is also the same as the address of the ending point of the original program.

Secondly, the description information of two program segments of the program are acquired, the program segments being in sequence in playing order, the two segments being a previous program segment and a subsequent program segment, the description information, comprising the ending point information of the previous program segment and the start point information of the subsequent program segment (step S120). The program segments are program contents that are formed due to content editing, according to the invention, and are independent from other parts of the program, for example, a newly added segment of program content, etc.

Even as every program, each program segment has its corresponding description information, for example, the time length of playing, the time to start playing, the time to finish playing, the start and ending address, etc. The start time or address is the start point information of the program segment, and the ending time or address is the ending point information of the program segment. The description information may be used to identify the program segment.

Then, according to the acquired information of both the start and ending points of the program segment and playing order of the program segments, a piece of guiding information is generated to guide the playing to the ending point information of a program segment from the start point information of another program segment (Step S130). According to the sequence relationship, the ending of a program segment is just a start of another program segment, so the guiding information establishes a guiding relation between the ending point information of the previous program segment and the start point information of the subsequent program segment for an application to call and play the program to the ending point of the previous program segment and/or begin playing at the start point of the subsequent program segment.

When the playing of a program comes to the ending point of the previous program segment, according to the guide of the guiding information, the optical disc playing apparatus may continue to play the program from the start point of the subsequent program segment.

In the case that the whole program is deleted, the guiding information may guide the playing from the start point information of the original program directly to its ending point information.

Finally, according to the guiding information, the description information of the program is updated (Step S140). According to the invention, the editing of the program on the optical disc is only limited to updating the content, structure and description information of the program, it does not involve editing of the application related to the playing of the program, so it needs to update the original description information of the program, which not only guarantees that the application calls the programs normally, but also ensures the editing of the program content may work.

The description information is updated according to the generated guiding information for guiding the playing of program segments. The updating includes generating the sequence connection between respective program segments, such as the guiding information of the ending point information, etc. The updating may further include generating guiding information of time or address information between the start point information and the ending point information. For example, if the start address of the called part is in the middle of the deleted program segment, the description information will guide the corresponding application to perform the calling operation from another address.

Through the method for editing optical disc programs provided by the invention, the updating of the description information does not alter the external structure of the program, so it has no impact on the calling of the program by the application, and it does not need to edit the application or consider whether the application and the editing operation are at the same function layer, thereby excessively detailed application editing work and an expense of high buffer cost may be avoided.

Figure 2:
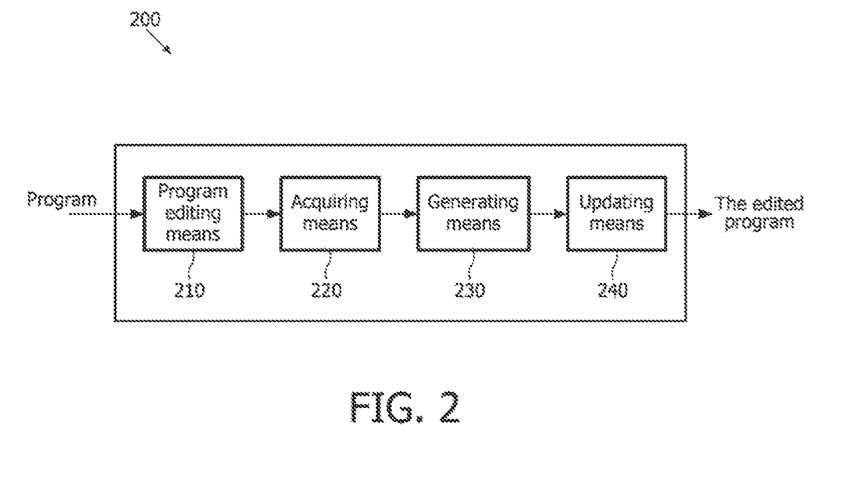
FIG. 2 is a block diagram of an optical disc editing apparatus according to an embodiment of the invention.

FIG. 2 is a block diagram of an optical disc editing apparatus according to an embodiment of the invention. The apparatus 200 comprises an acquiring means 220 for acquiring the description information of two program segments of the program, the program segments being in sequence in playing order, one being a previous program segment and the other being a subsequent program segment the description information comprising the ending point information of the previous program segment and the start point information of the subsequent program segment.

Apparatus 200 also comprises a generating means 230 for generating a guiding information to guide the calling and playing from the ending point information to the start point information according to the description information and playing order of the program segments, and the guiding information is used to guide the calling and playing from the ending point information to the start point information. According to the playing order, an ending of a program segment is just a start of another program segment, so the guiding information establishes a guiding relationship between the ending point information of the previous program segment and the start point information of the subsequent program segment. When the playing of a program comes to the ending point of the previous program segment, then according to the guiding information, the optical disc playing apparatus may continuously play the program from the start point of the subsequent program segment.

Apparatus 200 also includes an update means 240 for updating the description information of the program according to the guiding information. The update of the description information comprises establishing the sequential connection between respective program segments, for example, the guiding information of the ending point information, etc. It may further comprise generating guiding information for time or address information between the ending point information and start point information. For example, if the start point address r0 of the called part R is in the middle of a deleted part, the description information may guide the playing from the r0 address, and instead, based on the guiding information, to begin playing from a start point address of a subsequent program segment immediately following the deleted part.

Apparatus 200 may also comprise a program editing means 210 for editing the program content. The editing of program content causes the program content to become more than two program segments that are relatively independent.

Through the optical disc program editing apparatus provided by the invention, the updating of the description information does not alter the external structure of the program, so it has no impact on the calling or playing of the program by the application, and it does not need to edit the application or consider whether the application and the editing operation are at the same function layer, thereby excessively detailed application editing work and an expense of high buffer cost may be avoided.

Figure 3:
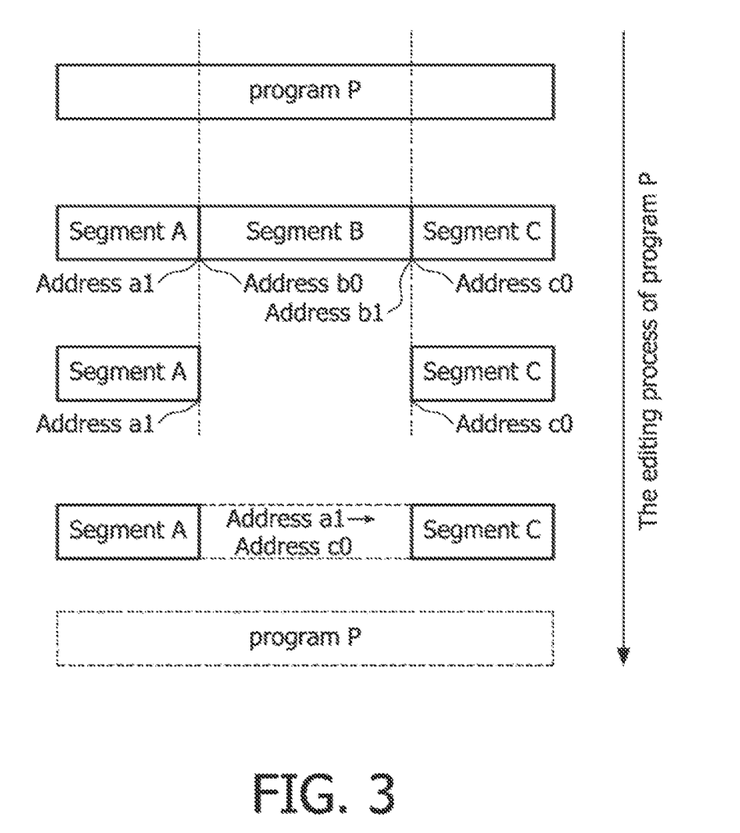
FIG. 3 is a schematic diagram illustrating the process to edit a program according to the invention.

FIG. 3 is a schematic diagram illustrating the process to edit a program according to the invention. Program P is a program stored on a re-writable optical disc. An editor (e.g. the user) deletes the program segment B from program P, so that the program P is divided into non-consecutive segment A and segment C. The address of program segment B is from address b0 to address b1 wherein address b0 is immediately forward adjacent to the ending point address a1 of the program segment A, and address b1 is immediately backward adjacent to the start point address c0 of the program segment C.

According to the prior art, the program segments A and C may be processed respectively as independent programs. Such solution needs a complex editing of the related application. If the application is not in the function layer at which program editing is performed, the application cannot be edited correspondingly. According to the prior art, the program segments A and C may also be stored in a huge buffer, after being integrally edited as a complete consecutive file, they are then stored on an optical disc. This solution needs a buffer of high cost.

According to the invention, a piece of guiding information is generated with regard to program segments A and C, the guiding information is schematically represented as follows: address a1→address c0. When playing the optical disc, the guiding information guides the optical disc playing means from the ending point of program segment A to the start point of program segment C, so that the program is played consecutively. As shown by program P in the dashed block of FIG. 3, the description information of the updated program P keeps program P still as a complete consecutive program in form.

Below is an example of updating the description information of a program.

```
zzzzz.clipi {
clip type; //Virtual or Real
if (clip_type=Real)
{
    Use the clip information for real clip;
}
if(clip_type=Virtual)
{
    Num_Info_Slot; //the number of Clipinfo slots, bridge plus real info
    For (i=0; i<Num Info Slot; i++)
    {
    Info type; //Real or Bridge
    if (-Info type = Real)
    {
    Starttime; //the start time/position of this clip in original timeline
    Endtime; ////the end time/position of this clip in original timeline
        clipinfo file name; //aaaaa.clipi
    }
    else    //For Info Bridge
    {
        Endtime_previous; //the end time/position of previous clip in
                //original timeline
        Starttime_next; //the start time/position of next clip in original
                //timeline
        Clipinfo_file_name_previous; //aaaaa.clipi
        Clipinfo_file_name_next; //bbbbb.clipi
        }
}
}
```

In this example, clipi is a program stored on a re-writable optical disc. If the program is never edited, the optical disc playing apparatus plays the program according to the description information of clipi (Use the clip information for real clip).

If the program clipi has been edited to thereby include more than two program segments, then the clipi is called as a virtual clip in this example, it needs to update the description information when playing the program. The updated description information comprises guiding information Info Bridge. The info bridge is the guiding information generated according to the invention, wherein the info Bridge includes the ending point information of a previous program segment ending point and the start point information of a subsequent program segment start point, and the corresponding information for guiding the playing to stop at the ending point and/or to begin playing at the start point. In this example, the start and ending information used by the program segments is time information.

The guide of address or time information of a called program part, may be realized by updating the description information of a program. The updating is carried out in a manner for guiding an application in calling and playing, according to the guiding information and the address or time information between the ending point and start point.

According to the design of the optical disc playing function, the application may call a whole program or part of the contents of the program. FIGS. 4-1 to 4-4 are schematic diagrams showing four cases of an application calling and playing a partial content R of program P. After a part of program is deleted, program P comprises two segments A and C.

Corresponding to program segments A and C, the description information of program P includes a piece of guiding information: address a1→address c0, and further comprises the guiding information of the address of the called program part.

In FIGS. 4-1 to 4-4, R is a program part that needs to be called by the application, and r0 and r1 are the start point information and ending point information of the called part R respectively, they may be address information or time information. Below the description is made taking address information as an example.

Figure 41:
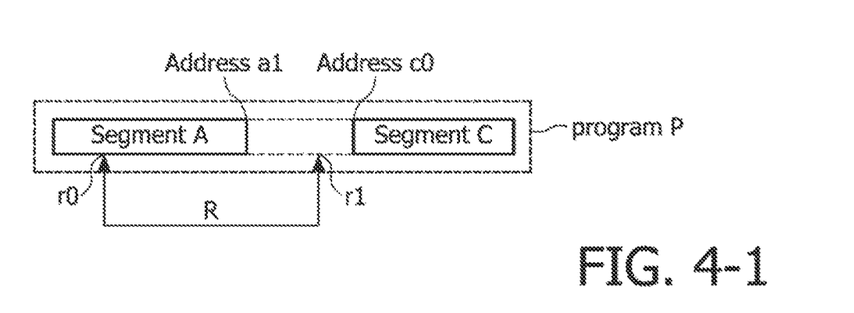

FIG. 4-1 is a schematic diagram illustrating the first case. The start point address r0 of the called part R is before the address a1, the ending point address r1 is between the addresses a1 and c0. According to the description information of program P and the relative positions of r0 and r1 and a1 and c0, for playing purposes, address r1 is equivalent to address a1, i.e. the description information will guide the application to actually call the part of program content from address r0 to a1 (because there is nothing to play between a1 and r1). Through the description information updated according to guiding information, the application does not need any modification, in the meanwhile, this avoids an error when playing between address a1 and r1.

Figure 42:
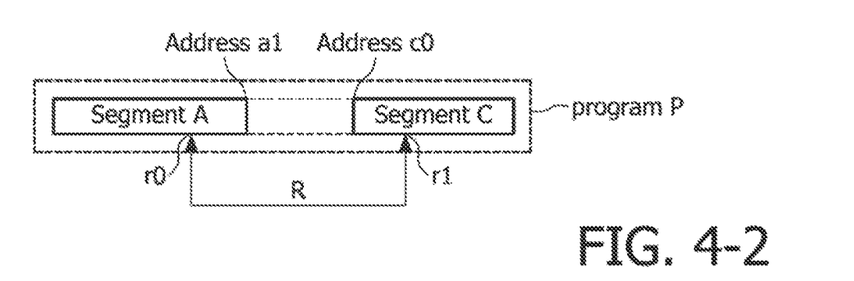

FIG. 4-2 is a schematic diagram illustrating the second case. The start point address r0 of the called part R is before the address a1, and the ending point address r1 is after c0. According to the guiding information of program P, the called program content R is played from r0 to a1, and the playing is directly guided to address c0 for continuous playing, thereby avoiding an error when playing between a1 to c0.

Figure 43:
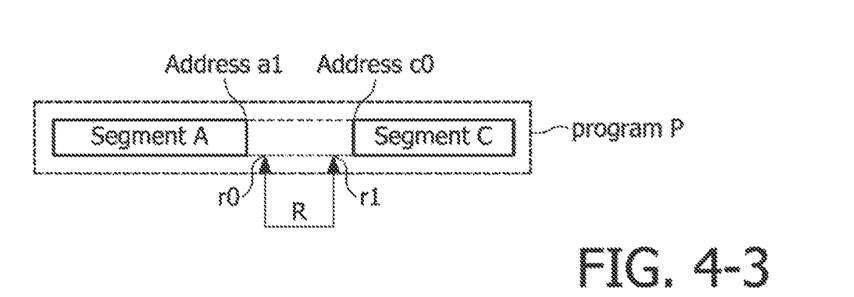

FIG. 4-3 is a schematic diagram illustrating the third case. The start point address r0 and the ending point address r1, of the called part R of the A/V program, are between address a1 and c0. According to the guiding information of program P, the called program content R is empty, and is equivalent to or represented as address r0=r1. In this case, the optical disc playing apparatus may directly perform the following playing procedure, give a hint to the user that the called part R has been deleted, or give further hint to the user about whether the corresponding application shall be deleted.

Figure 44:
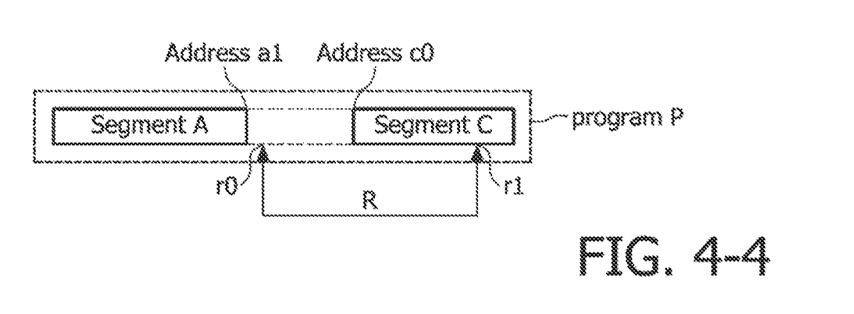

FIG. 4-4 is a schematic diagram illustrating the fourth case. The start point address r0 of the called part R is between address a1 and address c0, and the ending point address r1 is after address c0. According to the guiding information of program P, the address of r0 is equivalent to address c0 because there is nothing to be played between r0 and c0, i.e. the actually called part is the part of program content from address c0 to r1.

Through the method and apparatus for editing optical disc programs provided by the invention, when editing the content of a program, it does not need to edit the relevant applications, no matter whether the applications and the program editing operation are in the same function layer, and it does not need to perform integration and buffering of the edited program, thereby avoiding excessively detailed application editing work and an expense of high buffering cost.

Although the invention is described in combination with preferred embodiments, apparently various replacements, modifications and changes made by those skilled in the art according to the contents described above will be obvious. Therefore, all of such replacements, modifications and changes shall come within the spirit and scope of the claims of the invention.

What is claimed is:

1. Apparatus for editing an audio/video program, comprising:
an editing processor comprising hardware and configured to edit an audio/video program into a first program segment and a second program segment, the second program segment being subsequent to and non-contiguous with the first program segment, wherein the first program segment and the second program segment each have a start point and an ending point;
an acquiring processor comprising hardware and configured to acquire information related to the ending point of the first program segment and information related to the start point of the second program segment;
a generating processor comprising hardware and configured to generate guiding information for playing from the ending point of the first program segment to the start point of the second program segment, the guiding information representing a bridge between the non-contiguous first and second program segments; and
an updating processor comprising hardware and configured to:
update a descriptive information associated with the audio/video program with the generated guiding information; and
provide an indication that the descriptive information was updated; and
wherein the updated descriptive information represents a sequential connection relationship between the respective first and second program segments.

2. The apparatus of claim 1, wherein the audio/visual program is stored on a re-writable storage medium.

3. The apparatus of claim 2, wherein the start point and the ending point of the programs segments includes at least one of: a time information, and an address information.

4. The apparatus of claim 1, wherein the guiding information represents a sequential connection relationship between the first and second program segments.

5. The apparatus of claim 1, comprising:
a playing apparatus configured to play the first and second segments of audio/video program based on the descriptive information of the audio/video program, the playing apparatus determining a presence of the indication that the descriptive information was updated.

6. The apparatus of claim 1, further comprising:
a playing processor comprising hardware and configured to play, using an application running on the editing apparatus, least a part of the audio/video program including a portion of at least one of: the first segment including the ending point of the first segment, or the second segment including the beginning point of the second segment.

7. The apparatus of claim 1, wherein the indication includes one of: real and virtual.

8. The apparatus of claim 7, wherein the virtual indication, indicates guiding information associated with corresponding pairs of first and second program segments.

9. A device for playing a part of an audio/video program, the device comprising:
a processor comprising hardware:
accessing descriptive information of an audio/video program;
determining whether an indication of an update of the descriptive information of a part of the audio/video program to be played is available, wherein the updated descriptive information includes guiding information that represents information for an ending point of a first program segment of the audio/video program and/or a start point of a second program segment of the audio/video program;
playing the audio/video program, when the indication of updated descriptive information is available, wherein playing the audio/video program comprises accessing the guiding information for playing the audio/video program until the ending point of the first program segment and/or transitioning to the start point of the second program segment;
wherein the updated descriptive information represents a sequential connection relationship between the respective first and seco d program segments; and
wherein the playing is based on the descriptive information of the audio/video program.

10. The device of claim 9, wherein the audio/video program is stored on a rewritable medium.

11. The device of claim 9, further comprising:
executing, by the processor comprising hardware of, hardware configured as an application for playing the audio/visual program in accordance with the description information.

12. A method for operating an audio/video program playing apparatus, the method comprising:
in an audio/video program playing apparatus:
accessing descriptive information associated with the audio/video program;
accessing an application for the playing of the audio/video program;
determining whether an indication of updated descriptive information is available;
playing, by the application, the audio/video program based on the updated descriptive information when the indication of updated descriptive information is available, wherein the update descriptive information includes an ending point of a first program segment and a start point of a second program segment, wherein the application plays the audio/video program up to the ending point of the first program segment and/or begins playing at the start point of the second program segment
wherein the updated descriptive information represents a sequential connection relationship between the respective first and second program segments.

13. A computer-readable storage-medium that is not a transitory propagating signal or wave, the medium modified by control information including instructions for performing a method for operating an audio/video program playing apparatus, the method comprising:
in an audio/video program playing apparatus:
accessing descriptive information associated with the audio/video program;
accessing an application for the playing of a part of the audio/video program to be played;
determining whether an indication of updated descriptive information is available for the part to be played;
playing, by the application, the part of audio/video program based on the updated descriptive information, when the indication of updated descriptive information is available wherein the updated descriptive information includes an ending point of a first program segment and a start point of a second program, wherein the application plays the audio/video program up to the ending point of the first program segment and/or plays beginning at the start point of the second program segment,
wherein the updated descriptive information represents a sequential connection relationship between the respective first and second program segments.

14. A method of operating an editing apparatus for an audio/video program stored on a rewritable media, the method comprising the steps of:
in the editing apparatus:
acquiring description information of a previous segment and a subsequent segment of an audio/video program, the segments being in consecutive playing order, the description information comprising ending point information of the previous segment and start point information of the subsequent segment;
determining start point information and ending point information of a part to be subsequently played of the audio/video program, with respect to the ending point information of the previous segment and the start point information of the subsequent segment;
generating a guiding information to control the playing of the part to be played in the playing order by an application, the guiding information for: changing the beginning of playing of the part to be played from the start point of the part to be played, to beginning the playing at the start point of the subsequent segment, depending on the description information; or changing from ending the playing at the ending point of the part to be played, to ending the playing at the ending point of the previous segment, depending on the description information;
updating the description information of the program according to the guiding information;
storing the updated description information of the audio/video program to the rewritable media; and
wherein the updated descriptive information represents a sequential connection relationship between the respective first and second program segments.

15. The method of claim 14, wherein the guiding information controls the playing by the application such that:
when according to the description information, the part to be played overlaps both the ending point of the previous segment and the start point of the subsequent segment, the part is played from the start point of the part to be played to the ending point of the previous segment, and then immediately from the start point of the subsequent segment to the ending point of the part to be played.

16. The method of claim 14, wherein the guiding information controls the playing by the application such that when according to the description information, the part to be played overlaps the ending point of the previous segment and does not overlap the start point of the subsequent segment, then the part is only played from the start point of the part to be played to the ending point of the previous segment.

17. The method of claim 14, wherein the guiding information controls the playing by the application such that when according to the description information, the part to be played does not overlap the ending point of the previous segment, but overlaps the start point of the subsequent segment, then the part is only played from the start point of the subsequent segment to the ending point of the part to be played.

18. The method of claim 14, wherein the guiding information controls the playing by the application such that when according to the description information, the part to be played is between the previous segment ending point and subsequent segment start point, so that it does not overlap either the ending point of the previous segment or the start point of the subsequent segment, the part to be played is not played, and an error code is generated.

19. The method of claim 14, wherein the guiding information controls the playing by the application such that:
when according to the description information, the part to be played overlaps both the ending point of the previous segment and the start point of the subsequent segment, the part is played from the start point of the part to the ending point of the previous segment, and then immediately from the start point of the subsequent segment to the ending point of the part to be played;
when according to the description information, the part to be played overlaps the ending point of the previous segment and does not overlap the start point of the subsequent segment, then the part is only played from the start point of the part to be played to the ending point of the previous segment;
when according to the description information, the part to be played does not overlap the ending point of the previous segment, but overlaps the start point of the subsequent segment, then the part is only played from the beginning point of the subsequent segment to the ending point of the part to be played; and
when according to the description information, the part to be played is between the previous segment ending point and subsequent segment start point, so that it does not overlap either the previous segment ending point or the subsequent segment start point, the part to be played is not played, and an error code is generated.

20. The method of claim 19, wherein the ending of the previous segment occurs prior to the start of the part of the program to be played, in the program playing order.

21. The method of claim 19, wherein the start of the subsequent segment occurs subsequent to the ending of the part of the program to be played, in the program playing order.

22. The method of claim 19, wherein the part to be played comprises an added segment of the program.

23. The method of claim 19, wherein the previous program segment comprises a segment of program content in front of the part of the program to be played which comprises an added to the program.

24. The method of claim 19, wherein the ending point information includes time information.

25. The method of claim 19, wherein the ending point information includes address information.

26. The method of claim 19, wherein the updating of description information comprises generating a sequence connection relationship between respective previous and subsequent program segments according to the guiding information.

27. The method of claim 19, wherein the updating of description information comprises generating the guiding information of address information to guide the playing between the ending point information and start point information according to the guiding information.

28. The method of claim 19, wherein the updating of description information comprises generating the guiding information of time information for playing the part of the program between the ending point information and start point information of the previous and subsequent program segments according to the guiding information.

29. An apparatus for editing audio/visual program on a re-writable media, the program editing apparatus comprising:
an acquiring processor comprising hardware and configured to acquire description information of two program segments of the program, the two program segments being in sequence in a playing order, the description information comprising an ending point information of a previous program segment and a start point information of a subsequent program segment;
a determining processor comprising hardware and configured to determine a start point information and an ending point information of a program segment to be played with respect to the ending point information of the previous program segment and the start point information of the subsequent program segment, wherein the program segment to be played start point information is determined as one of: up to the previously program segment ending point information and the subsequent program segment start point information and the program segment to be played ending point information is determined as one of: the previous segment ending point information and at least the subsequent segment start point information;
a generating processor comprising hardware and configured to generate a guiding information to guide the ending point information of the previous program segment to the start point information of the subsequent program segment according to the description information and playing order of the program segments with regard to the start point information and the ending point information of the program segment to be played;
an updating processor comprising hardware and configured to update the description information of the program according to the guiding information; and
a storing circuit comprising hardware and configured to store the updated description information of the program on the disc; and
wherein the updated descriptive information represents a sequential connection relationship between the respective first and second program segments.

30. The apparatus of claim 29, wherein the previous program segment comprises a segment of program content fully previous to the part of the program to be played which comprises a portion deleted from the program.

31. The apparatus of claim 29, wherein the subsequent program segment comprises a segment of program content fully subsequent to the part of the program to be played which comprises a portion deleted from the program.

32. The apparatus of claim 29, wherein the part of the program to be played comprises an added segment of the program between the previous and the subsequent segments.

33. The apparatus of claim 29, wherein the ending point information comprises ending time information.

34. The apparatus of claim 29, wherein the ending point information comprises ending address information or ending.

35. The apparatus of claim 29, wherein the updating of description information comprises generating a sequence connection relationship between respective previous and subsequent program segments according to the guiding information.

36. The apparatus of claim 29, wherein the updating of description information comprises generating a guiding information of address information between the ending point information of the previous segment and start point information of the subsequent, segment according to the guiding information.

37. The apparatus of claim 29, wherein the updating of description information comprises generating the guiding information of time information between the ending point information of the previous segment and start point information of the subsequent segment, according to the guiding information.

38. Apparatus for editing an audio/video program on a rewritable media, comprising:
   an acquiring processor comprising hardware and configured to acquire:
      description information of two program segments of the audio/video program, the two segments comprising a first program segment and a second program segment, the description information comprising start point information and ending point information of each of the program segments, wherein the second program segment is subsequent to the first program segment in a playing order; and
      description information associated with a part of the audio/video program to be played, the description information comprising a start point information and an ending point information for the part;
   a generating processor comprising hardware configured to generate guiding information between the first and second program segments according to the description information of the audio/video program, wherein the guiding information comprises a bridge between the first program segment and the second program segment, wherein the bridge includes start point information selected from the first program segment start point information or the second program segment start point information and ending point information selected from the ending point information of the first program segment and the ending point information of the second program segment;
   an updating processor comprising hardware and configured to update the descriptive information associated with the audio/video program with the generated guiding information; and
   a storing circuit comprising hardware and configured to store the updated guiding information to the rewritable media; and
   wherein the updated descriptive information represents a sequential connection relationship between the respective first and second program segments.

39. The apparatus of claim 38, wherein the start point and the ending point of the two audio/video program segments comprises one of: time information, and address information.

40. The apparatus of claim 38, wherein the start point information and the ending point information of the programs segments comprises one of: time information and address information.

41. The apparatus of claim 38, wherein the guiding information represents a sequential connection relationship between respective ones of the two program segments.

42. The apparatus of claim 38, further comprising a playing apparatus playing the part of the audio/video program based on the descriptive information of the audio/video program.

43. The apparatus of claim 38, wherein the guiding information is generated with regard to the ending point information of the first program segment and the start point information of the second program segment.

44. The apparatus of claim 38, wherein the guiding information is generated with regard to the start point information of the first program segment and the ending point information of the first program segment.

45. The apparatus of claim 38, wherein the guiding information is generated with regard to the start point information of the second program segment ending point information of the second program segment.

46. The apparatus of claim 38, wherein the guiding information is generated with respect to the start point information of the second program segment when the start point information of the part of the audio/visual program to be played is greater than the ending point information of the first program segment and less than the start point of the second program segment.

47. The apparatus of claim 38, wherein the guiding information is generated with respect to the ending point information of the first program segment when the ending point information of the part of the audio/visual program to be played is greater than the ending point information of the first program segment and less than the start point of the second program segment.

48. The apparatus of claim 38, wherein the guiding information is generated with respect to the start point information of the first program segment and the ending point of the second program segment when the start point information of the part of the audio/visual program to be played is less than the ending point information of the first program segment and the ending point information of the part to be played is greater than the start point of the second program segment.

49. A method for operating apparatus for editing an audio/video program on a re-writable media, the method comprising:
   acquiring:
      description information of two program segments of an audio/video program, the two program segments comprising a first and second program segments, the description information comprising start point information and ending point information of each of the two program segments, wherein the second program segment is subsequent to the first program segment in a playing order; and
      description information associated with a part of the audio/video program to be played, the description information comprising start point information and ending point information;

generating guiding information between the first and second program segments according to the description information of the audio/video program, wherein the guiding information comprises start point information selected between the first program segment start point information and second program segment start point information and ending point information selected between the ending point information of the first program segment and the ending point information of the second program segment;

updating the descriptive information associated with the audio/video program with the generated guiding information; and storing the updated descriptive information associated with the audio/video program to the rewritable media; and wherein the updated descriptive information represents a sequential connection relationship between the respective first and second program segments.

50. The method of claim 49, wherein the start point information and the ending point information of the part of the audio/video program to be played comprises at least one of: a time, or an address.

51. The method of claim 49, wherein the start point information and the ending point information of the two programs segments comprises at least one of: a time or an address.

52. The method of claim 49, wherein the guiding information represents a sequential connection relationship between respective ones of the two program segments.

53. The method of claim 49, further comprising playing the audio/video program based on the descriptive information of the audio/video program.

54. The method of claim 49, wherein the guiding information is generated with regard to the ending point information of the first program segment and the start point information of the second program segment.

55. The method of claim 49, wherein the guiding information is generated with regard to the start point information of the first program segment and the ending point information of the first program segment.

56. The method of claim 49, wherein the guiding information is generated with regard to the start point information of the second program segment and the ending point information of the second program segment.

57. The method of claim 49, wherein the guiding information comprises the ending point information of the first program segment when the ending point information of the part of audio/video program to be played is prior to the start point information of the second program segment.

58. The method of claim 49, wherein the guiding information comprises the start point information of the second program segment when the start point information of the part of the audio/visual program to be played is greater than the ending point information of the first program segment and less than the start point information of the second program segment.

59. A method for editing a video program on a re-writable media, the method comprising the steps of:

acquiring description information of two program segments of a video program, via an acquiring processor, the two segments comprising a previous program segment and a subsequent in sequence in playing order, the description information comprising ending point information of the previous program segment and start point information of the subsequent program segment;

generating a guiding information to guide the calling of the video program from the ending point information to the start point information according to the description information and playing order of the two program segments, via a generating processor; and updating the description information of the program according to the guiding information, via an updating processor, and wherein when the program portion to be called by an application comprises a deleted part, the calling of an ending point of the program portion to be called that is within the deleted part is guided to an ending point of a previous program segment, or the calling of a start point of the program portion to be called that is within the deleted part is guided to a start point of a subsequent program segment; and wherein the updated descriptive information represents a sequential connection relationship between the respective first and second program segments.

60. The method as claimed in claim 59, wherein the previous program segment comprises a segment of the program in front of the deleted part of the program.

61. The method as claimed in claim 59, wherein the subsequent program segment comprises a segment of the program behind the deleted part of the program.

62. The method as claimed in claim 59, wherein the two program segments comprise an added segment of the program.

63. The method as claimed in claim 59, wherein the previous program segments comprise a segment of the program in front of the added part of the program.

64. The method as claimed in claim 59, wherein the ending point information of (new) The program segment includes the ending point time information of the program segment.

65. The method as claimed in claim 59, wherein the ending point information of (new) The program segment includes the ending point address information of the program segment.

66. The method as claimed in claim 59, wherein the updating of description information comprises generating the sequence connection relationship between respective program segments according to the program segment guiding information.

67. The method as claimed in claim 59, wherein the updating of description information comprises generating the guiding information of address information between the ending point of the previous program segment and start point of the subsequent program segment according to the program segment guiding information.

68. The method as claimed in claim 59, wherein the updating of description information comprises generating the guiding information of time information between the ending point of the previous program segment and start point of the subsequent program segment according to the guiding information.

69. An apparatus for editing a video program on a re-writable media, the apparatus comprising:

an acquisition processor comprising hardware and configured to acquire description information of two program segments of the program, the two program segments being a previous segment and a subsequent segment in sequence in playing order, with no segments to be played between them, the description information comprising ending point information of the previous program segment and start point information of the subsequent program segment;

a generation processor comprising hardware and configured to generate a guiding information to guide the calling of the video program from the ending point information to the start point information according to the description information and playing order of the program segments; and an update processor comprising hardware and configured to update the description information of the program according to the guiding information, wherein the update processor is configured to update such that, when a program portion to be called by an application comprises a deleted part, the calling of an ending point of the program portion within the deleted part is guided to an ending point of a previous program segment, or the calling of a start point of the program portion within the deleted part is guided to a start point of a subsequent program segment; and wherein the updated descriptive information represents a sequential connection relationship between the respective first and second program segments.

70. The apparatus as claimed in claim 69, wherein the two program segments comprise a segment of the program in front of the deleted part of the program.

71. The apparatus as claimed in claim 69, wherein the two program segments comprise a segment of the program behind the deleted part of the program.

72. The apparatus as claimed in claim 69, wherein the two program segments comprise an added segment of the program.

73. The apparatus as claimed in claim 69, wherein the program segments comprise a segment of the program in front of the added part of the program.

74. The apparatus as claimed in claim 69, wherein the ending point information includes the time ending information of the program segment.

75. The apparatus as claimed in claim 69, wherein the ending point information includes the address ending information of the program.

76. The apparatus as claimed in claim 69, wherein the updating of description information comprises generating the sequence connection relationship between respective program segments according to the program segment guiding information.

77. The apparatus as claimed in claim 69, wherein the updating of description information comprises generating the guiding information of address information between the ending point and start point according to the program segment guiding information.

78. The apparatus as claimed in claim 69, wherein the updating of description information comprises generating the guiding information of time information between the ending point and start point according to the program segment guiding information.

* * * * *